United States Patent

Takizawa

[11] 4,322,095
[45] Mar. 30, 1982

[54] SAFETY BELT DEVICE FOR VEHICLES

[75] Inventor: Junichi Takizawa, Isesaki, Japan

[73] Assignee: Fuji Jukogyo Kabushiki Kaisha, Tokyo, Japan

[21] Appl. No.: 64,441

[22] Filed: Aug. 6, 1979

[30] Foreign Application Priority Data

Aug. 7, 1978 [JP] Japan .................................. 53-96039
Jan. 19, 1979 [JP] Japan .............................. 54-5863[U]

[51] Int. Cl.³ ............................................. B60R 21/10
[52] U.S. Cl. .................................... 280/802; 280/808; 297/469
[58] Field of Search ............... 280/802, 803, 804, 805, 280/808; 297/469

[56] References Cited

U.S. PATENT DOCUMENTS 3,897,963  8/1975  Seiffert ................................. 280/802
4,189,169  2/1980  Meuser ................................. 280/802
4,201,418  5/1980  Reidelbach ........................... 280/805

FOREIGN PATENT DOCUMENTS 2300696  9/1976  France ................................. 280/804
1509920  5/1978  United Kingdom ................. 280/803

Primary Examiner—John P. Silverstrim
Attorney, Agent, or Firm—Martin A. Farber

[57] ABSTRACT

A safety belt device for a vehicle having without glass frames doors and a pair of seats, comprising a retractor provided on the floor between the seats, a door pole upwardly extending from a rear portion of the door to a connecting portion higher than an occupant's shoulder, and a safety belt connected between the retractor and a seat belt connecting portion of the door pole. When the door is closed, the safety belt extends diagonally across the occupant's body, and when the door is opened, the safety belt is positioned to permit the occupant to get in and out of the vehicle.

12 Claims, 17 Drawing Figures

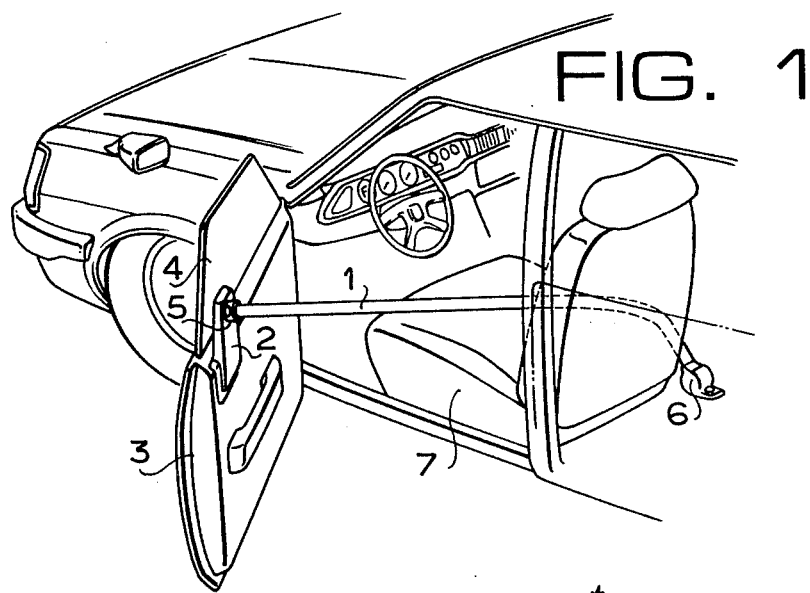
FIG. 1
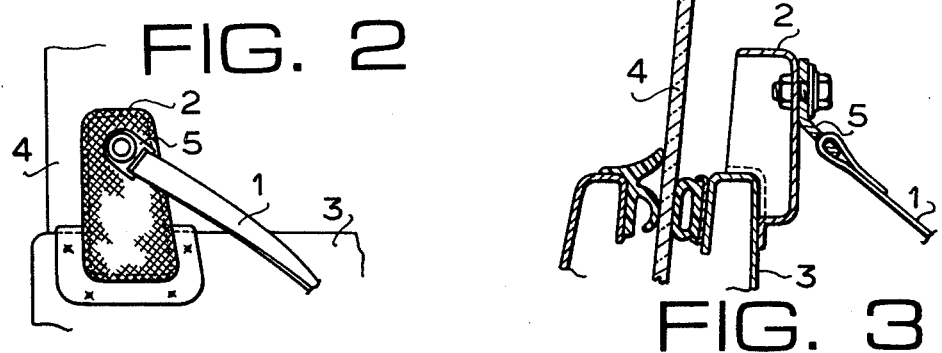
FIG. 2
FIG. 3
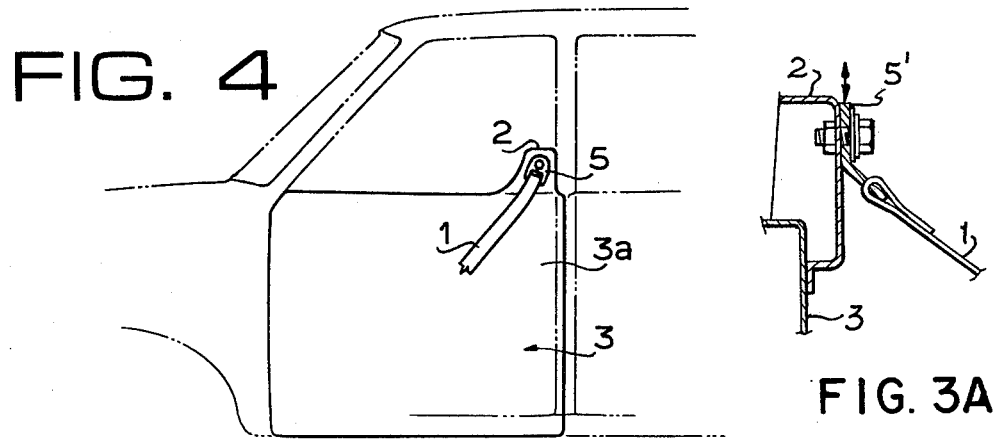
FIG. 4
FIG. 3A

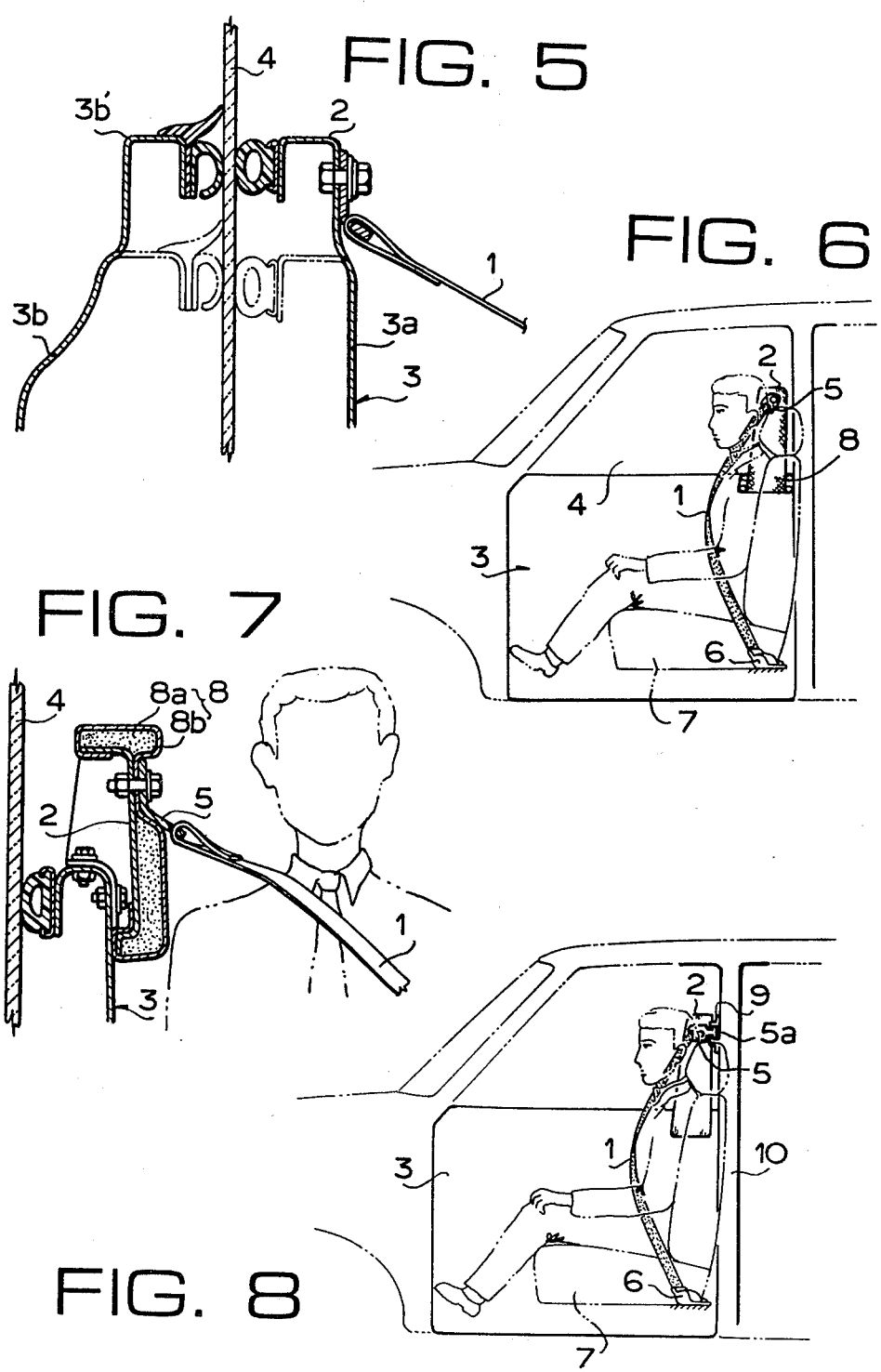

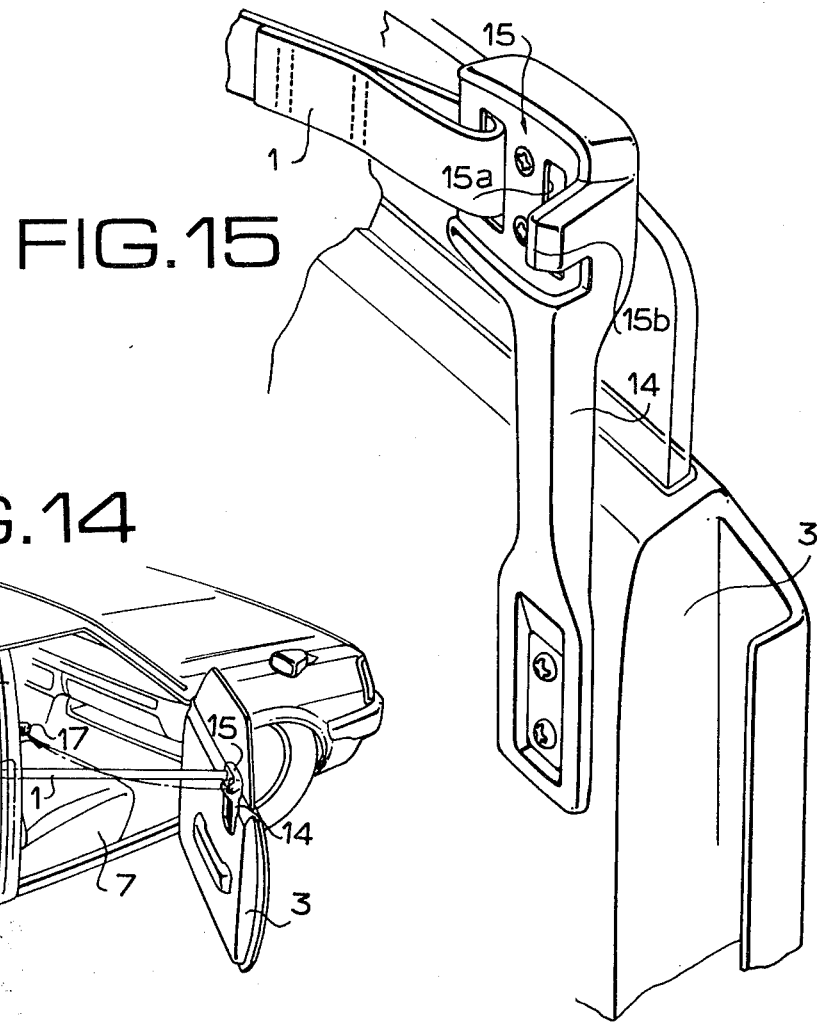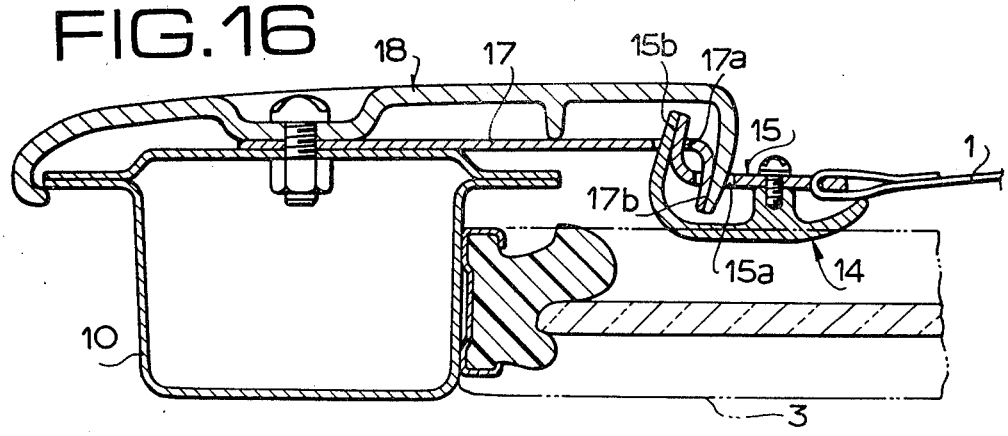

SAFETY BELT DEVICE FOR VEHICLES

BACKGROUND OF THE INVENTION

The present invention relates to a safety belt device for protecting an occupant i.e., including the driver seated in a vehicle, such as an automobile, from injury.

There has been provided a passive safety belt device in which a safety belt is automatically fitted to the occupant's body by closing the door of the vehicle and the safety belt is automatically removed from the occupant's body by opening the door, whereby the passenger is permitted to get out of the vehicle. The known conventional passive safety belt device is complicated in construction of a safety belt driving mechanism or a guiding device for fitting the belt to the occupant's body and for removing it. Consequently, the passive safety device is expensive and requires a considerable space for installation thereof.

SUMMARY OF THE INVENTION

The present invention provides a passive safety belt device without any belt driving mechanism and belt guiding device.

According to the present invention, there is provided a safety belt device for a vehicle having doors without glass frames, comprising a retractor provided in a lower portion of a central portion of the vehicle, a door pole upwardly extending from a rear portion of said door, and a safety belt connected between said retractor and said door pole, a seat belt connecting portions of the retractor comprising a winding means and means for locking said safety belt when an excessive impact force is exerted on the retractor, whereby said safety belt extends diagonally across the occupant's body, when said door is closed.

With the above and other objects and advantages in view, the present invention will become more clearly understood in connection with the detailed description of a preferred embodiment, when considered with the accompanying drawings, of which:

BRIEF DESCRIPTION OF THE DRAWINGS

FIG. 1 is a perspective view showing an embodiment in an automobile according to the present invention, FIG. 2 is a side view showing a door pole portion of the device of FIG. 1, FIG. 3 is a sectional view of the door pole portion, FIG. 3A is a sectional view of the door pole portion with an adjustable anchor, FIG. 4 is a side view showing another embodiment of the present invention, FIG. 5 is a sectional view of a door pole portion of the device shown in FIG. 4, FIG. 6 is a side view of a further embodiment of the present invention, FIG. 7 is a sectional view of a door pole shown in FIG. 6, FIG. 8 is a side view showing a still further embodiment of the present invention, FIG. 14 is a perspective view showing a further embodiment of the present invention, FIG. 15 is a perspective view showing a door pole portion in FIG. 14, and FIG. 16 is a sectional view of the door pole portion of FIG. 15.

DESCRIPTION OF THE PREFERRED EMBODIMENTS

Figure 9:
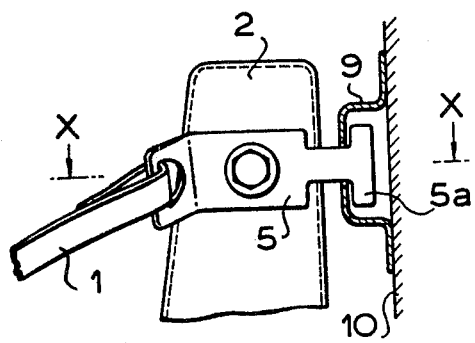
FIG. 9 is a side view showing a door pole portion in FIG. 8.

Referring to FIGS. 1, 2 and 3, a safety belt 1 has one end connected to retractor 6 provided on a central body member between seats 7, such as a floor or a lower portion of the seat, and the other end of the belt is connected to an anchor 5 provided on a door pole 2. The door pole 2 is secured to a door 3, which has no glass frame, at an upper and rear portion of the door body so as to upwardly extend a predetermined height from the door body along the inside of a window 4. The door pole 2 is so arranged to extend along the back rest of the seat, so that the occupant's view is not obstructed by the door pole. It will be seen that if the door pole is made of transparent resin, the occupant's view and the outward appearance of the door pole may be improved. Further, it is preferable to provide the anchor 5'(FIG. 3A) to be capable of adjusting its height according to the height of the occupant.

In operation, when the door 3 is closed, the door pole 2 is positioned outside and behind and with a seat belt connection portion above the shoulder of the occupant and the safety belt 1 is wound in the retractor 6, so that the safety belt extends diagonally across the occupant from the shoulder to the hip to restrain the occupant's body at a predetermined pressure. When the door is opened, the safety belt is pulled from the retractor 6 and positioned to permit the occupant to get in and get out of the automobile as shown in FIG. 1. It will be noted that the door pole 2 must be made to have a strength against the impact load. The retractor 6 comprises, for example, a winding drum urged by a spring to wind the safety belt and a locking device which is so designed as to permit the rotation of the winding drum during normal retraction of the safety belt and to secure and restrict the rotation of the drum when the locking device is subjected to a load greater than a predetermined value upon an impact.

Referring to FIGS. 4 and 5, the door pole 2 is constructed integrally with an inner panel 3a of the door 3 by upwardly extending the inner panel. An outer panel 3b is also upwardly extended to form a projection 3b' corresponding to the door pole 2 for providing a nice external appearance. Other than the construction of the door pole 2 this embodiment is the same as the previous embodiment in FIGS. 1 to 3.

Referring to FIGS. 6 and 7, the surface of the door pole 2 is covered with a cushion 8 comprising an elastic material 8a such as urethane and a cover 8b. Other parts are same as the device of FIG. 1 and are identified by the same numerals as FIG. 1. The cushion 8 is to prevent injuries to the occupant's head, shoulder and the like by the window 4 upon the lateral collision.

Referring to FIGS. 8 to 13 each of these embodiments is so arranged that the impact load may be absorbed by a body member of the automobile such as a center pillar, whereby it is possible to decrease the strength of the door pole.

Figure 10:
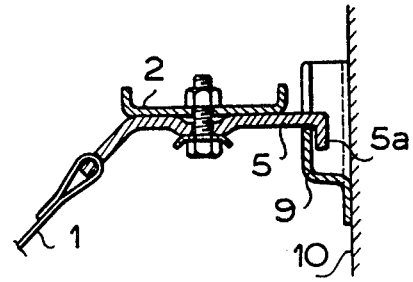
FIG. 10 is a sectional view taken along the line X—X in FIG. 9.

In the device of FIGS. 8 to 10, the anchor 5 rearwardly extends from the door pole 2 and has an engaging portion 5a at the end. A receiving member 9 is provided on the center pillar 10 as the body member of the automobile. The receiving member is adapted to receive the engaging portion 5a in the closed position of the door. Thus, the impact load may be received by the body member 10 of the automobile through the anchor 5 and the receiving member 9. Therefore, the impact force is not exerted on the door pole and door so that damage of the members may be prevented.

Figure 11:
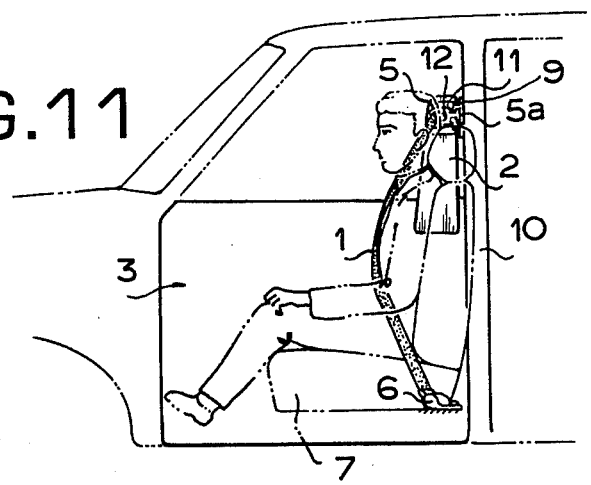
FIG. 11 is a side view showing a still further embodiment of the present invention.
Figure 12:
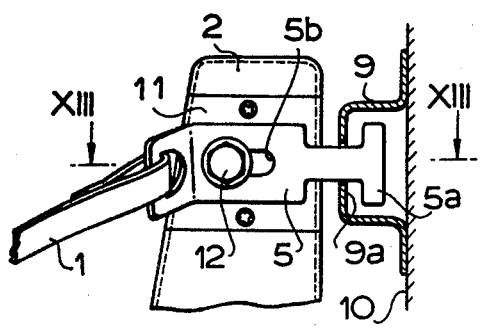
FIG. 12 is a side view showing a door pole portion of the device in FIG. 11.
Figure 13:
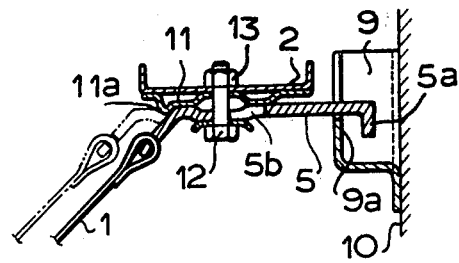
FIG. 13 is a sectional view taken along the line XIII—XIII in FIG. 12.

In the device of FIGS. 11 to 13, the anchor 5 having the engaging portion 5a is secured to the door pole 2 by a bolt 12 and nut 13 with interpositioning of a spring plate 11. The anchor 5 has an elongated hole 5b for for the bolt 12 and the spring plate 11 has a positioning projection 11a for positioning the anchor 5.

In the normal condition where the anchor 5 abuts on the positioning projection 11a, the engaging portion 5a of the anchor 5 is spaced from the engaging portion 9a of the receiving member 9 by a predetermined distance as shown in FIG. 13. Thus, engagement between the engaging portion 5a and the receiving member 9 may be easily performed, when the door is closed.

In the event that an excessive impact force is exerted on the anchor, the anchor is moved, passing over the positioning projection 11a in the forward direction as shown by the dot-dashed line in FIG. 13 with deflection of the spring plate 11. Thus, the engaging portion 5a abuts on the engaging portion 9a of the receiving member, so that the load may be fully received by the body member 10. In order to recover the device, the anchor 5 may be retracted to the normal position by a manual pushing force.

A cushion as described in the embodiment in FIGS. 6 and 7 is also provided in door poles of FIGS. 8 and 11.

Referring to FIGS. 14 to 16, a door pole 14 is secured to the door 3 and an anchor member 15 having an engaging hole 15a and an engaging projection 15b is secured to the door pole 14 by screws. On the other hand, an engaging member 17 is secured to the automobile body 10 as the center pillar together with a cover 18 of plastic. The engaging member 17 has an engaging hole 17a and an engaging projection 17b.

In the closed position of the door 3, the engaging projection 15b and the engaging hole 17a are engaged with each other, and the engaging projection 17b and the engaging hole 15a are engaged with each other as shown in FIG. 16. Therefore, the impact load is received by the body of the automobile.

As described above, in accordance with the present invention, the door pole is provided on the door without a glass frame at an upper and rear portion along the inside of the window and the safety belt is connected between the door pole and the retractor provided on the central portion of the floor between the seats, whereby the safety belt extends diagonally across the occupant's body in the closed position of the door and the safety belt is positioned to permit the occupant to get in and get out of the automobile. Thus, the present invention may provide an economical passive safety belt device without a driving mechanism and a guiding device such as a rail. Further, by positioning the door pole outside the shoulder of the occupant and providing a cushion on the door pole, it is possible to provide a safety device for the lateral collision. In addition, it is possible to receive the impact load by the body of the automobile by such a construction where the door pole is coupled to the body member of the automobile. Thus, the occupant's safety may be further ensured.

In addition, by securing the anchor for the safety belt to the door pole with the interposition of a spring plate, it is possible for the anchor to be slid forwardly by a predetermined distance, when an excessive load is exerted on and for the anchor to easily engage with the engaging member provided on the body member of the automobile, when the door is closed.

What is claimed is:

1. A device for securing an occupant of a vehicle having a door without a glass frame and a seat, said door including an inner panel adjacent said seat, said device comprising a safety belt, retractor means for winding and unwinding, respectively, said safety belt and for securing said safety belt when an excessive impact force is exerted on said safety belt, said retractor means being mounted in a central lower portion of the vehicle, a door pole rigidly connected to a rear edge of said inner panel of the door and extending upwardly therefrom into a connection portion disposed adjacent to but spaced from the top of the vehicle at a level higher than a shoulder of a reasonable tallest occupant able to occupy the seat of the vehicle, said connection portion constituting means for operatively connecting one portion of said safety belt remote from said retractor means, whereby said safety belt extends from said retractor means to said connection portion of said door pole at portions of said safety belt higher than the shoulder of the occupant with said safety belt extending diagonally across the body of the occupant when the door is closed, and an outside panel included in said door, said outside panel having a portion extending upwardly opposite said door pole.

2. The safety belt device according to claim 1, wherein said safety belt is a single piece belt extending from said means for operatively connecting said one portion of said safety belt to said retractor means.

3. A device for securing an occupant of a vehicle having a fixed body portion, a door without a glass frame movable relative to said body portion, and a seat adjacent said door, said device comprising a safety belt, retractor means for winding and unwinding, respectively, said safety belt and for securing said safety belt when an excessive impact force is exerted on said safety belt, said retractor means being mounted in a central lower portion of the vehicle, a door pole rigidly connected to a rear portion of the door and extending upwardly therefrom into a connection portion disposed adjacent to but spaced below the top of the vehicle at a level higher than a shoulder of a reasonable tallest occupant able to occupy the seat of the vehicle, an anchor longitudinally slidably connected to said connection portion of said door pole at a position higher than the shoulder of said occupant, said one portion of said safety belt being connected to said anchor, whereby said safety belt extends from said retractor means to said connection portion of said door pole at portions of said safety belt higher than the shoulder of the occupant with said safety belt extending diagonally across the body of the occupant when the door is closed, said anchor being formed with an engagement portion, a spring plate means disposed between said door pole and said anchor, and an engagement means being disposed on said body portion of said vehicle at a predetermined distance from said engagement portion of said anchor in the closed position of said door, said engagement means for engaging said engagement portion when said anchor is slid upon predetermined impact force, said spring plate means being so arranged that when said predetermined impact force is exerted on said anchor said anchor slides on said spring plate such that said engagement means engages said engagement portion.

4. The safety belt device according to claim 3, wherein said anchor is formed with a rearwardly extending projection forming said engagement portion, and said engagement means has an abutment surface formed with a hole, said projection engaging into said hole in the closed position of said door with said spring plate means holding said projection spaced from said abutment surface until occurrence of said predetermined impact force when said projection slides against said abutment surface.

5. The safety belt device according to claim 4, wherein said spring plate means is formed with a positioning projection for positioning and restraining said anchor from sliding until the occurrence of said predetermined impact force, whereupon said anchor slides over said positioning projection deflecting said spring plate.

6. The safety belt device according to claim 5, wherein said projection of said anchor and said abutment surface form oppositely projecting L-shaped hooks, said spring plate is fixed to said door pole.

7. The safety belt device according to claim 3, further comprising a cushion covering said door pole.

8. The safety belt device according to claim 3, wherein said door has a panel, said door pole is integral with said panel of said door.

9. The safety belt device according to claim 8, wherein said door pole extends from adjacent a rearmost edge of the door.

10. The safety belt device according to claim 3, wherein said door pole extends upwardly from adjacent an uppermost edge of said door.

11. The safety belt device according to claim 3, wherein said anchor is capable of adjusting its height according to the height of the occupant.

12. A device for securing an occupant of a vehicle having a structurally fixed body portion, a door without a glass frame movable relative to said body portion, and a seat, said device comprising a safety belt, retractor means, mounted in a central lower portion of the vehicle, for winding and unwinding, respectively, said safety belt and for securing said safety belt when an excessive impact force is exerted on said safety belt, a door pole rigidly connected to a rear portion of the door and extending upwardly therefrom into a connection portion disposed adjacent to but spaced from the top of the vehicle at a level higher than a shoulder of a reasonable tallest occupant able to occupy the seat of the vehicle, an anchor connected to said connection portion on said door pole at a higher position than the shoulder of said occupant, said one portion of said safety belt being connected to said anchor whereby said safety belt extends from said retractor means to said connection portion of said door pole at portions of said safety belt higher than the shoulder of the occupant with said safety belt extending diagonally across the body of the occupant when the door is closed, an engaging means disposed on said body portion of the vehicle for engagement with said anchor in the closed position of said door, said anchor and said door pole each have a rearward L-shaped end together forming a first engaging projection, said engaging means and said anchor formed with holes, respectively, said engaging means being formed with a front L-shaped end forming a second engaging projection pointing opposite to and overlapping said first engaging projection when the door is closed with said projections engaged in said holes, respectively and, a cover completely disposed over said engaging means.

* * * * *